A. HOTCHKISS.
Projectile.
No. { 102. / 1,207. }
Reissued July 2, 1861.
Fig. I.
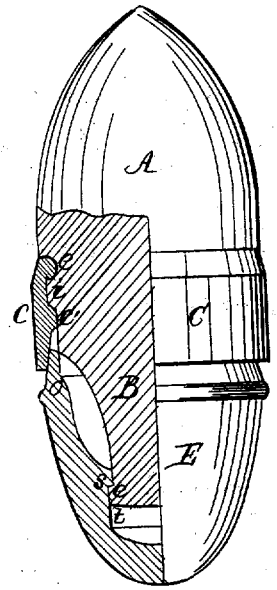
Fig. II.
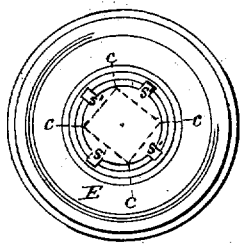
A. A. Hotchkiss
Witnesses.
S. H. Burnett
Wm. B. Smith
N. PETERS, PHOTO-LITHOGRAPHER, WASHINGTON, D. C.

UNITED STATES PATENT OFFICE.

A. A. HOTCHKISS, OF SHARON, CONNECTICUT, ADMINISTRATOR OF ESTATE OF A. HOTCHKISS, DECEASED.

IMPROVED PROJECTILE FOR RIFLED ORDNANCE.

Specification forming part of Letters Patent No. 13,679, dated October 16, 1855; Reissue No. 1,207, dated July 2, 1861.

*To all whom it may concern:*

Be it known that ANDREW HOTCHKISS, of Sharon, in the county of Litchfield, in the State of Connecticut, deceased, did invent certain new and useful Improvements in Projectiles for Ordnance; and I do hereby declare that the following is a full, clear, and exact description of the same, reference being made to the annexed drawings, making a part of this specification, in which—

Figure I is a side view or elevation, partly in section. Fig. II is a view of a part in detail, and similar letters refer to similar parts throughout.

This invention is for certain improvements in projectiles for ordnance, and the construction and operation are as follows:

The body of the shot is of a casting having one end formed into a blunted point, similar to the usual conical balls, as seen at A in Fig. 1. The opposite end of this body, from a little beyond the middle, tapers off into a tail-piece, (seen at B,) and is also squared at the end. Upon each corner of the square the metal is cut away a little, so as to form a projection, (shown at the letter *c*,) the object of which will be explained farther on. About the middle of the body A two recesses are formed completely around, as at *e e'*, thus leaving a projection, *i*, between. Upon these the lead ring is cast, and the recesses and projections serve to keep it on. This ring is at C, part being shown in section. From the point at *e'* it will be seen that the inner surface is chamfered off, as shown, and leaves a cup-shaped termination.

The second casting will now be described. This consists of a cap, which is to inclose the tail-piece B, and is to effect the expansion of the projecting edge of the lead ring into the grooves of the cannon. It is shown at E, Fig. I, with a view looking directly into the interior in Fig. II. The rim of this cap is chamfered or beveled off from the outside, as shown in the sectional part at *o*, and where it will be seen to fit in and press upon the like beveled edge of the leaden ring. In the head of the cap, inside, is a projecting ring, *s*, through which four notches, *s'*, are cut, as shown in Fig. II, and these permit the projections *c* to pass through. The object of this will now be made apparent, for by turning the cap slightly round the projections pass by the notches and become locked by the solid part of the ring, and thus the parts A and E are held together. In order that the cap may expand the leaden ring, it must have play upon the tail B, for which it will be seen there is room left in the cavity *t* beyond. The tail acts also as a guide to the cap, insuring a direct forward motion, since without such guide the cap might be driven a little out of the true line, and the result would be that the ring, being more expanded on one side than the other, would cause windage on that other side, and consequently destroy the accuracy of the fire.

The effects in the act of firing are as follows: The bore of the cannon must be spirally grooved, on a principle similar to that of a rifle. The flat part of the ring C should fit the smooth part or "lands" of the bore. In sending it down, the flexible ring must be slightly expanded by a blow of the rammer as soon as the shot is home. It is in the act of firing, however, that the ring C is expanded so as to take a full impression of the grooves, for by the force with which the cap E is driven toward the body of the shot, or A, and before momentum is communicated to the latter, the lead ring will be expanded, that being the point of least resistance, and be thereby caused to take the impression of the grooves, as also to be packed tightly against the rest of the chamber. This prevents windage, and of course insures the full effect of the powder, while at the same time rotary motion is imparted to the shot. The flexible ring has also this important advantage, that it does not wear or damage the grooves of the gun, even in case of stripping, should such action occur, and hence there is no reason why the wear should not be as long as in the plain bore.

What is claimed as the invention of ANDREW HOTCHKISS in projectiles for rifled ordnance is—

1. Constructing a projectile in three parts, one of them of flexible or plastic material, in the form of a ring interposed between the other two parts, formed of a harder material, and so arranged that in the act of loading or of firing, or of both, the resistance or the explosive effect of the powder, acting on a larger sectional area of the part E than the section of the ring C, shall cause the latter to be so expanded or distended that it shall take the impression of the grooves and be made to fit the bore of the gun, as described.

2. The tail-piece for securing the cap to the body of the shot, and as a guide to the cap in its forward motion, in the manner described.

A. A. HOTCHKISS,
*Administrator.*

Witnesses:
G. H. BABCOCK,
WM. B. SMITH.